United States Patent [19]

Sgrignoli

[11] Patent Number: 4,939,790
[45] Date of Patent: Jul. 3, 1990

[54] PLL FREQUENCY STABILIZATION IN DATA PACKET RECEIVERS

[75] Inventor: Gary J. Sgrignoli, Mount Prospect, Ill.

[73] Assignee: Zenith Electronics Corporation, Glenview, Ill.

[21] Appl. No.: 174,251

[22] Filed: Mar. 28, 1988

[51] Int. Cl.$^5$ .............................................. H04B 1/10
[52] U.S. Cl. ................................ 455/260; 370/94.1; 455/265; 455/308; 375/52; 375/83
[58] Field of Search ............... 455/257, 259, 260, 265, 455/308, 264; 375/45, 48, 44, 46, 83, 84, 85, 81, 52; 370/60, 94, 85, 94.1; 358/86

[56] References Cited

U.S. PATENT DOCUMENTS

| | | | |
|---|---|---|---|
| 4,068,199 | 1/1978 | Madoff | 332/19 |
| 4,105,975 | 8/1978 | Sanders et al. | 375/83 |
| 4,246,654 | 1/1981 | Malm | 375/83 |
| 4,471,328 | 9/1984 | Chapman | 332/9 R |
| 4,481,489 | 11/1984 | Kurby | 332/19 |
| 4,553,161 | 11/1985 | Citta | 455/5 |
| 4,567,447 | 1/1986 | Srivastava et al. | 331/1 A |
| 4,567,603 | 1/1986 | Howell et al. | 375/65 |
| 4,574,374 | 3/1986 | Scordo | 455/5 |
| 4,592,076 | 5/1986 | El-Banna | 375/108 |
| 4,631,718 | 12/1986 | Miyao | 370/4 |
| 4,633,193 | 12/1986 | Scordo | 331/1 A |
| 4,646,287 | 2/1987 | Larson et al. | 370/60 |
| 4,651,104 | 3/1987 | Miyo | 328/139 |
| 4,651,330 | 3/1987 | Ballance | 375/108 |
| 4,668,922 | 5/1987 | Crawford et al. | 331/1 A |
| 4,670,888 | 6/1987 | Smith, III | 375/62 |
| 4,703,520 | 10/1987 | Rozanski, Jr. et al. | 455/75 |

*Primary Examiner*—Joseph A. Orsino
*Assistant Examiner*—Frank M. Scutch, III

[57] ABSTRACT

A frequency stabilization circuit for a PSK data packet receiver includes a reference oscillator for supplying a continuous reference signal to a limiter that supplies feeds received data packets to a phase locked loop detection circuit including a voltage controlled oscillator. The frequency of the continuous reference signal is close to the carrier frequency of the data packets and maintains the frequency of the voltage controlled oscillator close to the data packet carrier frequency between data packets. During data packets, the reference oscillator signal is "swamped out" by the limiter.

7 Claims, 1 Drawing Sheet

PLL FREQUENCY STABILIZATION IN DATA PACKET RECEIVERS

BACKGROUND OF THE INVENTION AND PRIOR ART

This invention relates generally to phase shift keyed (PSK) data packet receivers and particularly to means for stabilizing such a receiver to minimize its pull in and lock up time.

Cable television systems include a head-end that is physically linked to a large number of subscriber terminals by means of individual coaxial cables for providing a wide variety of television-related programming and services for a fee. Each cable subscriber terminal has a uniquely identifiable decoder and the head-end generally includes, or has access to, a computer which, by appropriate data signals, controls the operation of the individual subscriber units in accordance with the type of service selected. The head-end computer may also prepare subscriber bills for the type of service received and perform other "housekeeping" chores.

In at least one such cable system, subscriber terminals automatically transmit information to the cable head-end in direct response to a so-called polling signal from the head-end or indirectly in a "contention" arrangement where subscriber units keep trying to send data to the head-end until a communication takes place. The data is transmitted in a PSK data packet format. Each data packet includes a number of preamble bits to enable lock up of the transmitted signal in the data receiver in the head-end, a group of address bits to associate that data with the particular subscriber unit, a group of bits for conveying the desired information and a small group of bits for error detection. Since the data is transmitted in binary form, phase shift keying of the carrier wave is a very attractive technique with a 0° carrier phase, for example, being used to indicate a logic "1" and an opposite 180° carrier phase being used to indicate a logic "0".

In a PSK system, there is no readily recoverable carrier. While a carrier sample may be sent, that would involve an extra signal and the transmission would be subject to noise problems. Generally, the system includes a phase locked loop (PLL) for locking to the carrier frequency of the data packet. The present invention is directed to a technique for permitting ready lock up of the PLL without requiring long preambles that are detrimental to system throughput.

In the cable system above described, data packets from the individual subscribers are sequentially transmitted and the head-end receiver is subjected to periods of strong signal, where its voltage controlled oscillator (VCO) is locked to the carrier frequency of the PSK data, and periods of no signal where its VCO free runs. The invention involves applying to the PLL input a continuous reference carrier frequency signal of substantially the same frequency as the PSK carrier. The reference carrier keeps the VCO in the PLL close to the lock up frequency and enables rapid lock up when a PSK data packet is received.

The reference signal is applied to a limiter and has an amplitude that is about 15 dB below the level of the lowest amplitude PSK data on the system. When a data packet is received, the reference signal is swamped out by limiter action and the PLL locks to the frequency and phase of the received data packet. When the data packet ends, the PLL locks to the reference frequency. Consequently, the reference frequency signal keeps the VCO close to the frequency of the data packets and is automatically disabled when a data packet is received.

OBJECTS OF THE INVENTION

A principal object of the invention is to provide a novel PLL frequency stabilization technique for PSK data packet receivers.

Another object of the invention is to provide a PSK data receiver system with enhanced lock up time.

BRIEF DESCRIPTION OF THE DRAWINGS

These and other objects and advantages of the invention will be apparent upon reading the following description in conjunction with the drawings in which.

DESCRIPTION OF THE PREFERRED EMBODIMENT

Figure 1:
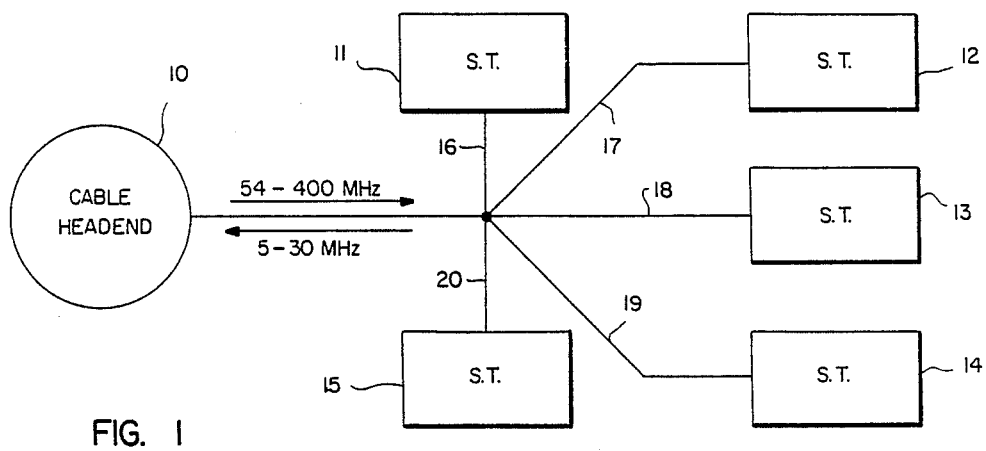
FIG. 1 is a block showing of a prior art cable system in which the invention is especially useful.

Referring to FIG. 1, there is shown a highly simplified arrangement of a cable head-end and subscriber terminals (decoder units) arranged in accordance with the prior art. Head-end 10 is coupled to a plurality of subscriber terminals 11, 12, 13, 14 and 15 via a plurality of coaxial cables 16, 17, 18, 19 and 20, respectively. It will be appreciated that the head-end includes, or has access to, computer apparatus and means for transmitting television program information to the subscriber terminals and to send, as well as to receive data messages to each subscriber unit. As indicated on the drawings, television signal information is transmitted in a frequency range of 54-450 MHz from the head-end to the subscriber decoders. It will be appreciated that the 450 MHz frequency limit is merely representative of present technology and practice and should not in any way be considered a limitation on the use of the invention. Subscriber decoder functions may, for example, be controlled from the head-end by appropriate data transmission in the vertical interval of a television signal, in accordance with common practice. The decoder functions could also be controlled by means of separate communication links, either on or off the cable, that are not associated with the television signal transmission. Transmissions from the subscriber decoders to the head-end may be by a carrier having a frequency well below 54 MHz, such as via a 5.5 or 11.0 MHz carrier, as shown. As is well known, each subscriber terminal is identified by a unique binary address that is recognizable by the head-end and each terminal decoder includes an oscillator for generating the RF carrier signal for transmitting data back to the head-end. The head-end includes a master oscillator that is tuned to the same frequency as the subscriber terminal oscillators and a receiving circuit for receiving the transmitted signals from the subscriber terminals. While all of the oscillators are crystal controlled, there is an inevitable difference in their frequency and phase and the carrier recovery system must be capable of reliable operation with these differences.

Figure 2:
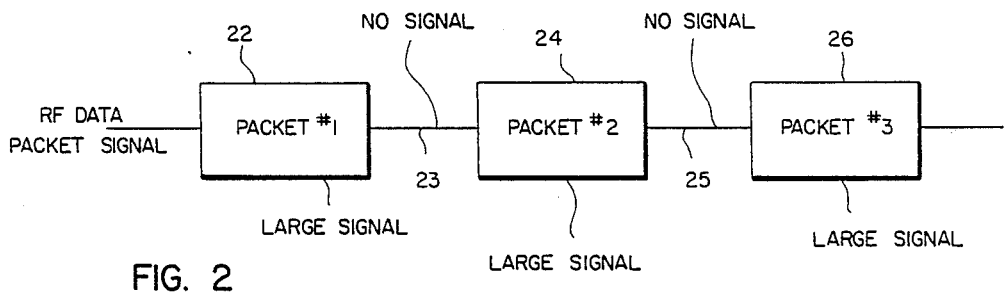
FIG. 2 is a depiction of the packet system of transmitting data in the prior art system of FIG. 1.

In FIG. 2, the technique of transmitting information in data packets such as data packets 22, 24 and 26 is illustrated. It will be seen that there are periods between data packets, such as periods 23 and 25, that represent "no signal" conditions interspersed with periods, i.e. 22, 24 and 26, when large signals are transmitted. It is the no signal periods (23, 25) between the large signal periods that create problems for the VCO in the cable head-end and that the present invention solves. Specifically, the VCO may need added time to lock to the different signals from subscriber terminals, and this results in a lowering of the system throughput. Stated differently, the system must allocate sufficient time to accommodate the worst case condition, which is the longest lock up time.

Figure 3:
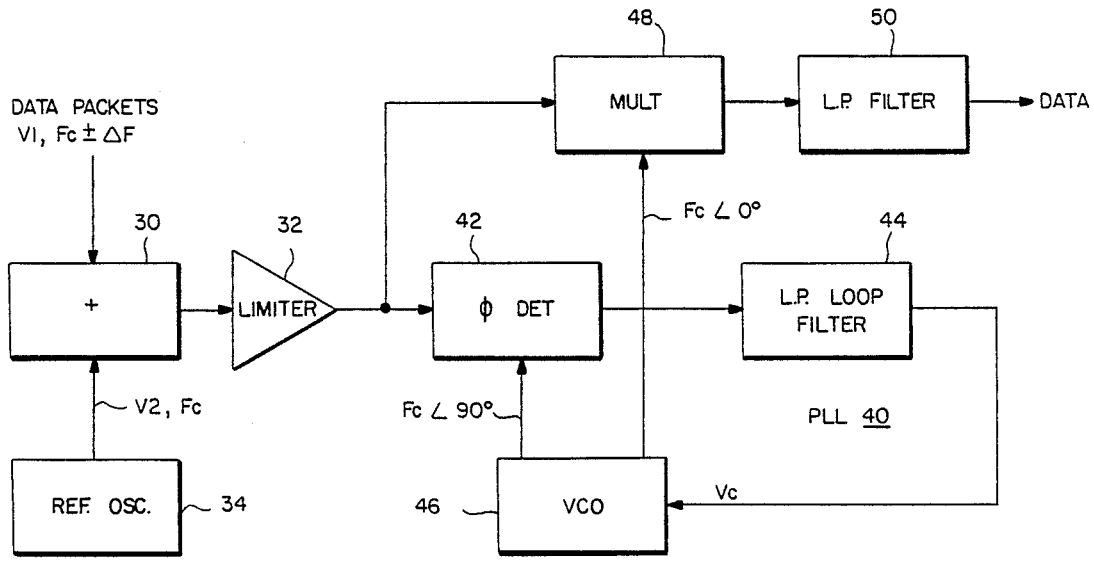
FIG. 3 is a partial block diagram showing the inventive arrangement.

In FIG. 3, a portion of the cable head-end PSK receiver is shown. The data packets from the individual subscriber units or terminals are received and represented by a voltage V1 and a frequency Fc±ΔF. The signal is applied to an adder 30 where a signal of frequency Fc at a voltage V2 from a reference oscillator 34 is combined therewith. The output of adder 30 is supplied to a limiter 32 whose output is coupled to the input of a PLL circuit 40. Specifically, the output of limiter 32 is supplied to a phase detector 42 that in turn supplies a low pass loop filter 44 which couples a control voltage Vc to a VCO 46. Limiter 32 also supplies a multiplier 48, the output of which is coupled to another low pass filter 50 which supplies the data signal. VCO 46 develops an output signal Fc at 90° that is applied to phase detector 42 and an output signal Fc at 0° that is coupled to multiplier 48. The operation of the phase locked loop to recover data is well known in the art.

The use of reference oscillator 34 to supply a continuous signal of frequency Fc and a voltage V2 to adder circuit 30 constitutes the invention. The reference signal, in the absence of a received data packet, is applied directly to the input of limiter 32. The signal level is large enough to drive limiter 32 to full limiting. Therefore, in the absence of a data packet, the signal from reference oscillator 34 causes PLL 40 to lock up to Fc. When a data packet is received, the signal from reference oscillator 34 is overridden in limiter 32 since its voltage V2 15 dB or more below voltage V1. It will be appreciated that V1 will vary somewhat, depending upon which subscriber terminal is transmitting data, and that V2 is selected to be about 15 dB below the lowest expected V1 in the system. In this manner, a data packet from any system subscriber terminal will be large enough to swamp out the effects of the reference oscillator signal. This precludes the loop from failing to respond to data packets of low signal level. Since VCO 46 is operating at a frequency of Fc, which is close to the data packet carrier frequency, the pull in and lock up times for PLL 40 are minimized. With the invention, the throughput of data in the cable system is greatly improved and the need for long preambles in the data packets is obviated.

It is recognized that numerous modifications and changes in the described embodiment of the invention will be apparent to those skilled in the art without departing from its true spirit and scope. The invention is to be limited only as defined in the claims.

What is claimed is:

1. A data transmission system of the type including means for supplying data packets in the form of a phase shift keyed carrier signal to a limiter that is coupled to a phase locked loop having a voltage controlled oscillator, a filter and a detector for recovering the data, the improvement comprising:
   means for supplying a continuous signal having a frequency close to that of said carrier signal to said limiter.

2. The system of claim 1 wherein said means for supplying a continuous signal comprises a reference oscillator producing a signal that is approximately 15 dB below the level of the lowest data packet carrier signal.

3. The system of claim 2, further including a cable head-end and a plurality of subscriber stations, each of which includes means for transmitting data packets to said cable head-end at approximately the same carrier signal frequency.

4. A cable television system comprising:
   a head-end;
   a plurality of subscriber terminals, each including oscillator means for transmitting information to said head-end in the form of data packets of phase shift keyed carrier signal of given frequency;
   means in the head-end for receiving data packets transmitted by said subscriber terminals;
   detection means in said head-end including a limiter coupled to a phase locked loop, said phase locked loop having a voltage controlled oscillator, a filter and a detector; and
   reference means for supplying a reference signal to said limiter for keeping the frequency of said voltage controlled oscillator close to said given frequency between reception of data packets.

5. The system of claim 4 wherein said reference means includes an oscillator having a signal output that is approximately 15 dB below the level of the lowest data packet signal level.

6. A method of operating a PSK data receiver for receiving data packets consisting of a phase shift keyed carrier of a given frequency comprising the steps of:
   applying received data packets to a limiter;
   applying the output of the limiter to a phase locked loop including a voltage controlled oscillator, a filter and a detector; and
   applying a reference signal to the limiter for maintaining a signal output from the limiter between data packets.

7. The method of claim 6 wherein the reference signal comprises an oscillator having a frequency substantially the same as said given frequency and wherein the output signal amplitude from the oscillator is about 15 dB below the level of the lowest level data packet signal.

* * * * *